United States Patent [19]

Meyer

[11] 3,903,175

[45] Sept. 2, 1975

[54] PROCESS FOR THE PRODUCTION OF PARTICULARLY PURE TETRA-CHLOROBISPHENOLS

[75] Inventor: Karl-Heinrich Meyer, Krefeld-Bockum, Germany

[73] Assignee: Bayer Aktiengesellschaft, Leverkusen-Bayerwerk, Germany

[22] Filed: Sept. 7, 1973

[21] Appl. No.: 395,145

[30] Foreign Application Priority Data
Sept. 8, 1972 Germany............................ 2244172

[52] U.S. Cl.......................... 260/619 R; 260/619 A
[51] Int. Cl...................... C07c 37/12; C07c 39/27
[58] Field of Search......... 260/619 R, 619 A, 623 H

[56] References Cited
UNITED STATES PATENTS 1,847,566   3/1932   Laschinger.................... 260/623 H
2,777,002   1/1957   Sullivan........................... 260/619 R
3,035,098   5/1962   Bryner............................. 260/619 A
3,143,575   8/1964   Bryner et al..................... 260/619 A
3,471,578   10/1969  Odenweller..................... 260/619 R

OTHER PUBLICATIONS

Sah et al., "J. Am. Chem. Soc.," Vol. 63, pp. 3164–3167, (1941).
Horning et al., "Organic Synthesis", Collective, Vol. III, pp. 247–249, (1955).

Primary Examiner—Howard T. Mars
Assistant Examiner—Norman Morgenstern
Attorney, Agent, or Firm—Plumley & Tyner

[57] ABSTRACT

A process for the production of tetrachlorobisphenols, especially tetrachlorobisphenol A and tetrachlorobisphenol Z, wherein chlorine and sulphur dioxide are allowed to act on the corresponding bisphenols, especially bisphenol A and bisphenol Z, at temperatures of from 0° to 50°C in the presence of solvents.

5 Claims, No Drawings

PROCESS FOR THE PRODUCTION OF PARTICULARLY PURE TETRA-CHLOROBISPHENOLS

It is known that bisphenols, such as bisphenol A [2,2-bis-(4-hydroxyphenyl)-propane], bisphenol Z [2,2-bis-(4-hydroxyphenyl)-cyclohexane] and other bis-(hydroxyphenyl)-alkanes, can be chlorinated, the hydrogen atoms in the o-position to the phenolic OH-group being replaced by chlorine.

The most interesting of these chlorination products is tetrachlorobisphenol A (3,3',5,5'-tetrachloro-4,4'-dihydroxy -2,2-diphenylpropane) which can be obtained by reacting bisphenol A produced on a commercial scale with chlorine.

Tetrachlorobisphenol A is used for the production of substantially non inflammable polycondensation products resistant to high temperatures, especially polycarbonates, which have to meet stringent purity requirements.

This explains why various processes have been developed both for the production and also for the purification of tetrachlorobisphenol A, all with the object of obtaining as pure a product as possible. Thus, bisphenol A has been chlorinated using a variety of different solvents such as 1,2-dichloroethane or glacial acetic acid (British patent specification No. 491,702), carbon tetrachloride (French Pat. No. 1,394,013), chloroform, trichlorethylene, perchlorethylene (Czech Pat. No. 106,367), aqueous aliphatic chlorinated hydrocarbons (DAS No. 1,213,948) and aqueous aromatic hydrocarbons.

Unfortunately, the crude chlorinated products obtained by these processes are not pure enough for the production of polycondensation resins. They contain coloured secondary products which are attributable partly to the splitting of the acid into phenol and isopropenylphenol known in respect of bisphenol A and partly to chlorination of the aliphatic propylidene group of bisphenol A.

Thus, various purification processes have been developed with a view to removing the troublesome secondary products by crystallisation or distillation. Recent disclosures have related particularly to purification by separating off certain crystalline adducts from tetrachlorobisphenol A and solvents, such as aliphatic chlorinated hydrocarbons, together with water (DOS No. 1,805,920) and adducts with flacial acetic acid (DOS No. 2,032,073), and also by the precipitation of alkali salts.

Although all these purification processes yield products of better quality, they are extremely expensive and are unable to prevent reductions in the yield through the formation of secondary products during chlorination.

It has now surprisingly been found that formation of the secondary products described above can be reduced to a minimum by carrying out chlorination of the bisphenols in solvents in the presence of sulphur dioxide while simultaneously removing the hydrogen chloride gas formed during the reaction, for example by blowing in a stream of nitrogen. Preferred solvents include aliphatic chlorinated hydrocarbons, such as methylene chlorde, 1,2-dichloroethane and more highly chlorinated hydrocarbons, also aromatic chlorinated hydrocarbons such as chlorobenzene, or mixtures thereof with aliphatic chlorinated hydrocarbons.

By applying this simple measure, it is possible on completion of chlorination and removal of the solvent by distillation to obtain light-coloured products which contain at most 0.01% of impurities in the chlorination of bisphenol A and at most 0.5% of impurities in the chlorination of bisphenol Z and which can be used for a number of polycondensation reactions without any need for further purification.

At the same time, various advantageous effects are obtained by virtue of this novel, combined procedure.

Thus, the chlorination of aliphatic side chains is completely prevented by the presence of $SO_2$. Under these conditions, pure tetrachlorobisphenol dissolved in methylene chloride can be exposed to the action of chlorine for hours on end without the product changing in any way. This interesting observation also applies as regards the solvent itself. Whereas methylene chloride can readily be converted into more highly chlorinated compounds, such as chloroform and carbon tetrachloride, by blowing in chlorine, a few percent of $SO_2$ added to the stream of chlorine is sufficient to prevent further chlorination.

In a solution in glacial acetic acid, secondary products are formed to a particularly serious extent from tetrachlorobisphenol A (TCB) as a result of overchlorination. In this case, too, the formation of impurities can be suppressed by the presence of $SO_2$, although not as effectively as in the case of methylene chloride and other chlorinated hydrocarbons, as shown in Table 1 below:

Table I

| Aftertreatment of pure TCB (54.5 g) with 12.7 g of $Cl_2$ at 38°C | | |
|---|---|---|
| Solvent | % secondary products as determined by gas chromatography | Tinting value of a 10 % Na-salt solution of the reaction product |
| 170 g of glacial acetic acid | 7.93 | iodine 400 |
| 170 g of glacial acetic acid 1.7 g of $SO_2$ | 0.95 | iodine 100 |
| 85 g of glacial acetic acid 85 g of methylene chloride 1.7 g of $SO_2$ | 0.01 | iodine 40 |
| 170 g of methylene chloride 1.7 g of $SO_2$ | — | Hazen 70 |

The quantity of $SO_2$ used in chlorination of the bisphenols described here can amount to from 1 to 30% by weight of the quantity of chlorine used and preferably to from 10 to 20% by weight. Since most of the $SO_2$ used remains in the reaction soltuion until the reaction is over, it can be distilled off together with the solvent and reused.

The removal during the reaction of the hydrogen chloride formed during chlorination by blowing in or developing inert gases or vapours, of the kind that can also be produced by evaporating the solvent in vacuo, clearly prevents the acid splitting of bisphenol A and its chlorination products. It Is surprising that no appreciable quantities of chlorine are entrained by the escaping inert gases during the greater part of chlorination.

Another advantage is that, by blowing in inert gas or by evaporating the solvent, it is possible despite the highly exothermic reaction to keep the temperature low without any need for additional cooling from outside, as a result of which chlorination progresses quickly whilst secondary reactions are largely suppressed. Suitable reaction temperatures are in the range of from 0° to 50°C, preferably from 15 to 25°C.

The new process is illustrated by the following Examples:

EXAMPLE 1

114 g of bisphenol A were suspended in 1590 g of methylene chloride in a 2-litre flask equipped with a stirring mechanism, after which 150 g of chlorine together with 20 g of sulphur dioxide and 200 litres of nitrogen were introduced over a period of 80 minutes. By blowing in nitrogen, the temperature was kept at 20°C during chlorination. The solvent was then distilled off, 183 g of tetrachlorobisphenol in the form of white crystals being obtained as residue. Yield (based on bisphenol A): 100%; melting point: 133.6°C; colour of the melt: iodine tinting value 1; colour of the 10% sodium-salt solution: Hazen tinting value 50.

According to analysis by gas chromatography, the product contained 0.009% of secondary products.

In comparison tests, modified experiments were carried out under the conditions specified above with $Cl_2$ and $N_2$ alone, with $Cl_2$ and $SO_2$ alone and with $Cl_2$ alone. In the last two of these tests, the reaction solution was cooled from outside in order to maintain the temperature. The varying quality of the chlorination product obtained is shown in Table 2 below:

Table 2

| Gases introduced | Characteristics of the tetrachlorobisphenol A obtained | | |
|---|---|---|---|
| | Melting point | Melt tinting value | Secondary products |
| $Cl_2$, $SO_2$, $N_2$ | 133.6°C | iodine 1 | 0.009 % |
| $Cl_2$, $SO_2$ | 133.0°C | iodine 4 | 0.058 % |
| $Cl_2$, $N_2$ | 132.0°C | iodine 20 | 0.082 % |
| $Cl_2$ | 132.0°C | iodine 50 | 0.110 % |

EXAMPLE 2

114 g of bisphenol A were again aclorinated in modified experiments in the same way as described in Example 1, except that 1,2-dichloroethane (1120 g) was used as solvent instead of methylene chloride. The results are set out in Table 3 below:

Table 3

| Gases introduced | Characteristics of the tetrachlorobisphenol A obtained | | |
|---|---|---|---|
| | Melting point | Melt tinting value | Secondary products |
| $Cl_2$, $SO_2$, $N_2$ | 133.0°C | iodine 2 | 0.01 % |
| $Cl_2$, $SO_2$ | 132.5°C | iodine 15 | 0.18 % |
| $Cl_2$, $N_2$ | 132.0°C | iodine 30–40 | 0.22 % |
| $Cl_2$ | 132.0°C | iodine 80 | 0.56 % |

EXAMPLE 3

114 g of bisphenol A were suspended in a mixture of 472 g of chlorobenzene and 472 g of methylene chloride, and 150 g of $Cl_2$, 20 g of $SO_2$ and 200 litres of $N_2$ were introduced over a period of 80 minutes. During this period, 665 g of methylene chloride were continuously added dropwise to replace the solvent evaporated and the temperature kept at 20°C. The solvent was then distilled off, ultimately in vacuo, leaving behind 183 g of white crystals as residue. Melting point: 133.6°C; colour of the melt: iodine tinting value 1; colour of the 10% sodium salt solution: Hazen tinting value 50; impurities according to a gas chromatogram: 0.01%.

EXAMPLE 4

114 g of bisphenol A were dissolved in 472 g of chlorobenzene at 100°C, and the resulting solution introduced dropwise with 1137 g of methylene chloride into a flask equipped with stirring mechanism over a period of 30 minutes. The flask was kept under a vacuum of 350 Torr and 75 g of $Cl_2$ together with 10 g of $SO_2$ introduced with vigorous stirring over the first 30 minutes. On completion of the dropwise addition, another 75 g of $Cl_2$ and 10 g of $SO_2$ were introduced in vacuo over a period of 50 minutes. The temperature of the reaction mixture was kept between 20 and 22°C throughout the entire test. The solvent was then distilled off. Residue: 183 g of white crystals; melting point: 133.4°C; melt tinting value: iodine 1.5; colour of the 10% sodium salt solution: Hazen tinting value 80; impurities 0.01%.

EXAMPLE 5

134 g of bisphenol Z were suspended in 1590 g of methylene chloride in the same way as described in Example 1, followed by the introduction over a period of 80 minutes of 150 g of $Cl_2$, 20 g of $SO_2$ and 200 litres of $N_2$ at a temperature of 20°C. Further comparison tests were carried out with chlorine and with chlorine and nitrogen alone. The characteristics of the products obtained following removal of the solvent by distillation are set out in Table 4 below:

Table 4

| Gases introduced | Characteristics of the tetrachlorobisphenol Z obtained | | |
|---|---|---|---|
| | Melting point | Melt tinting value | secondary products |
| $Cl_2$, $SO_2$, $N_2$ | 147°C | iodine 3 | 0.48 % |
| $Cl_2$, $N_2$ | 145°C | iodine 40 | 10.20 % |
| $Cl_2$ | 144°C | iodine 80 | 14.30 % |

EXAMPLE 6

Polycarbonates having relative viscosities and melt tinting values which were compared with one another were prepared from the tetrachlorobisphenols produced in different ways in Example 1 by phosgenating their aqueous sodium salt solutions in suspension with methylene chloride by phase interface condensation:

Table 5

| Tetrachloro-bisphenol produced with | rel. | Polycarbonates prepared therefrom | |
|---|---|---|---|
| | | Tinting value | Assessment |
| $Cl_2$, $SO_2$, $N_2$ | 1.265 | 1.8 | usable as a thermoplast |
| $Cl_2$, $SO_2$ | 1.228 | 6–7 | too dark |
| $Cl_2$, $N_2$ | 1.145 | approximately 30 | too dark and too low in molecular weight |
| $Cl_2$ | cannot be measured | dark streaks | unusable |

I claim:

1. A process for the production of a tetrachloro bis(hydroxyphenyl) alkane wherein the corresponding bis(hydroxyphenyl) alkane, dissolved in a solvent selected from the group consisting of an aliphatic or aromatic chlorinated hydrocarbon or a mixture thereof, is chlorinated with a mixture of chlorine and 1–30% by weight, based on the quantity of chlorine, of sulfur dioxide at a temperature of from 0° to 50°C while simultaneously removing the hydrogen chloride gas formed during the chlorination reaction.

2. The process of claim 1 wherein the hydrogen chloride gas formed is removed by blowing in an inert gas or vapor or by evaporating the solvent in vacuo during the chlorination.

3. A process as claimed in claim 1, wherein the bis(hydroxyphenyl)alkane is bisphenol A or bisphenol Z, whereby the product is tetrachlorobisphenol A or tetrachlorobisphenol Z.

4. A process as claimed in claim 1, wherein the sulfur dioxide is in a proportion of from 10 to 20% by weight of the chlorine used.

5. A process as claimed in claim 1, wherein the reaction is carried out at a temperature in the range of from 15° to 25°C.

* * * * *